Sept. 30, 1947. A. C. FRANKWICH ET AL 2,428,275
APPARATUS FOR MOLDING ARTICLES
Filed July 29, 1944 5 Sheets-Sheet 2
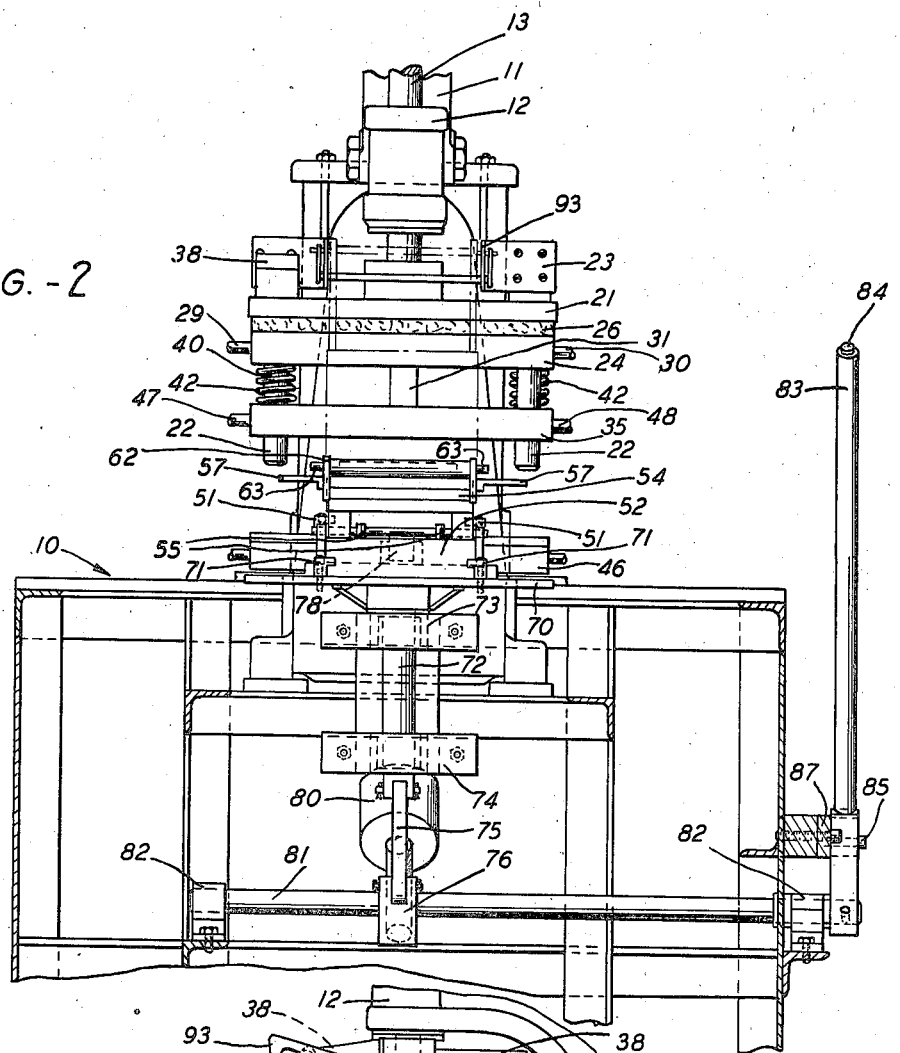
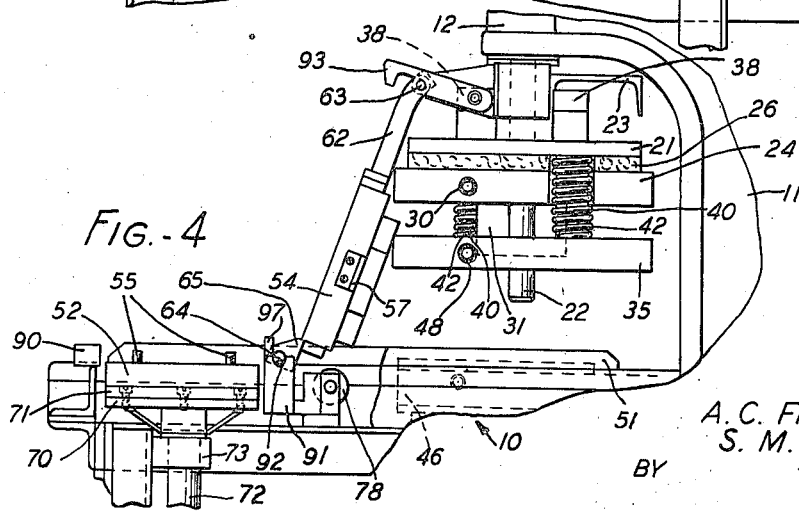
INVENTOR.
A. C. FRANKWICH
S. M. MARTIN
BY
ATTORNEY

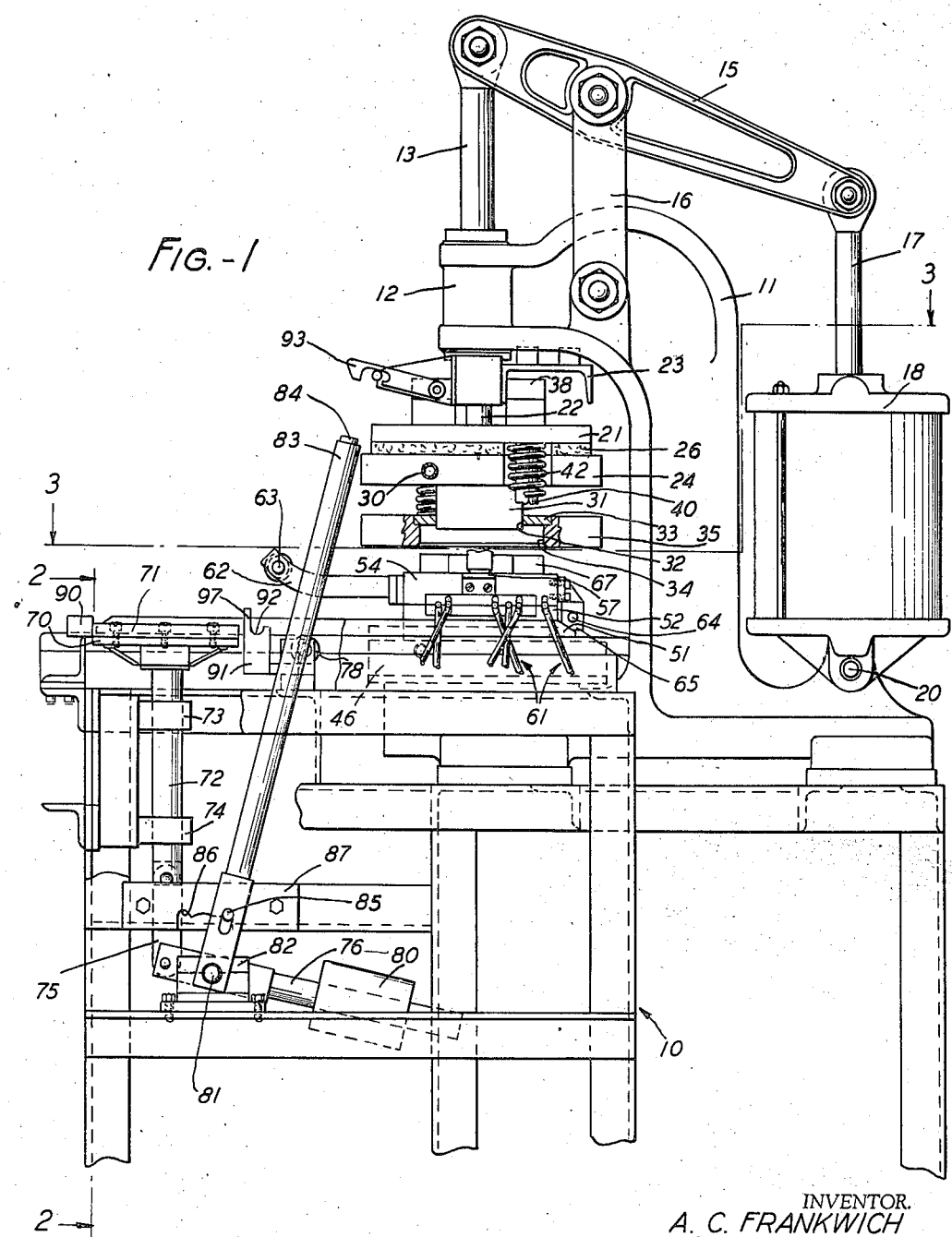

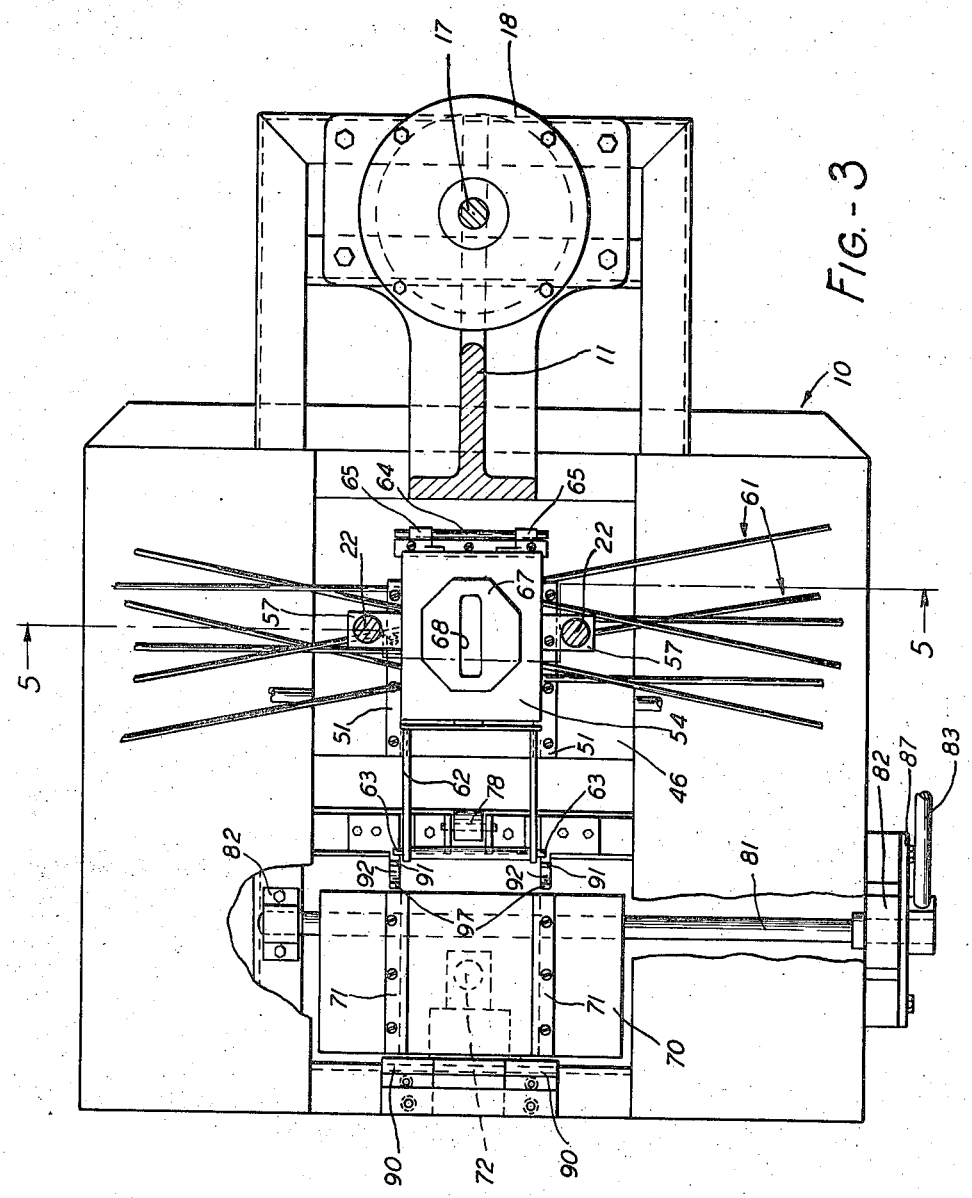

Sept. 30, 1947.   A. C. FRANKWICH ET AL   2,428,275
APPARATUS FOR MOLDING ARTICLES
Filed July 29, 1944   5 Sheets-Sheet 4

INVENTOR.
A. C. FRANKWICH
S. M. MARTIN
BY
ATTORNEY

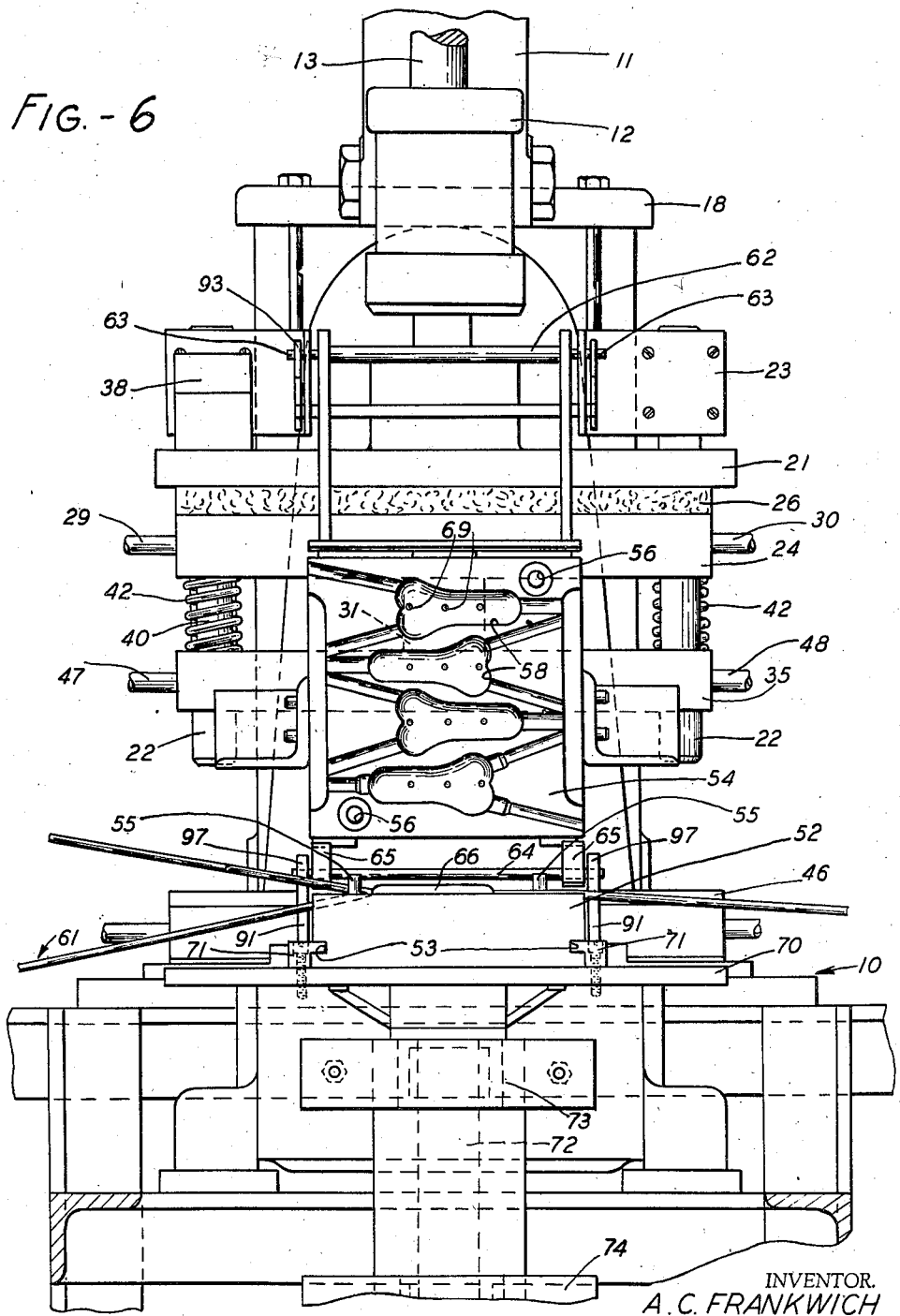

Patented Sept. 30, 1947

2,428,275

UNITED STATES PATENT OFFICE 2,428,275

APPARATUS FOR MOLDING ARTICLES

Alexander C. Frankwich and Samuel M. Martin, Baltimore, Md., assignors to Western Electric Company, Incorporated, New York, N. Y., a corporation of New York Application July 29, 1944, Serial No. 547,120

4 Claims. (Cl. 18—16)

This invention relates to apparatus for molding articles, and has for an object the provision of new and improved apparatus for molding articles.

In molding apparatus heretofore known of the type which has a pair of separable mold sections which are insertable under a press, it is impossible to open the sections in such a manner that molding cavities may be inspected and cleaned readily. Furthermore, in the molding apparatus of the prior art it is difficult to insert elements of articles into the mold cavities and to remove the molded articles from the cavities.

A molding apparatus embodying the invention comprises a molding press, a bottom mold section, a platen on the press provided with means for guiding the bottom mold section into molding position, an upper mold section, means for separating the upper mold section from the lower mold section, and means for mounting the upper mold section pivotally with respect to the lower mold section.

A complete understanding of the invention may be obtained from the following detailed description of a specific embodiment thereof, when read in conjunction with the appended drawings, in which Fig. 1 is a fragmentary, side view of an apparatus embodying the invention;

Fig. 2 is a fragmentary, vertical, sectional view of the apparatus taken along line 2—2 of Fig. 1;

Fig. 3 is a horizontal, sectional view of the apparatus taken along line 3—3 of Fig. 1;

Fig. 4 is a fragmentary side view of the apparatus showing certain elements thereof in positions different from those shown in Fig. 1;

Fig. 6 is an enlarged, fragmentary, vertical sectional view of the apparatus.

Figure 5:
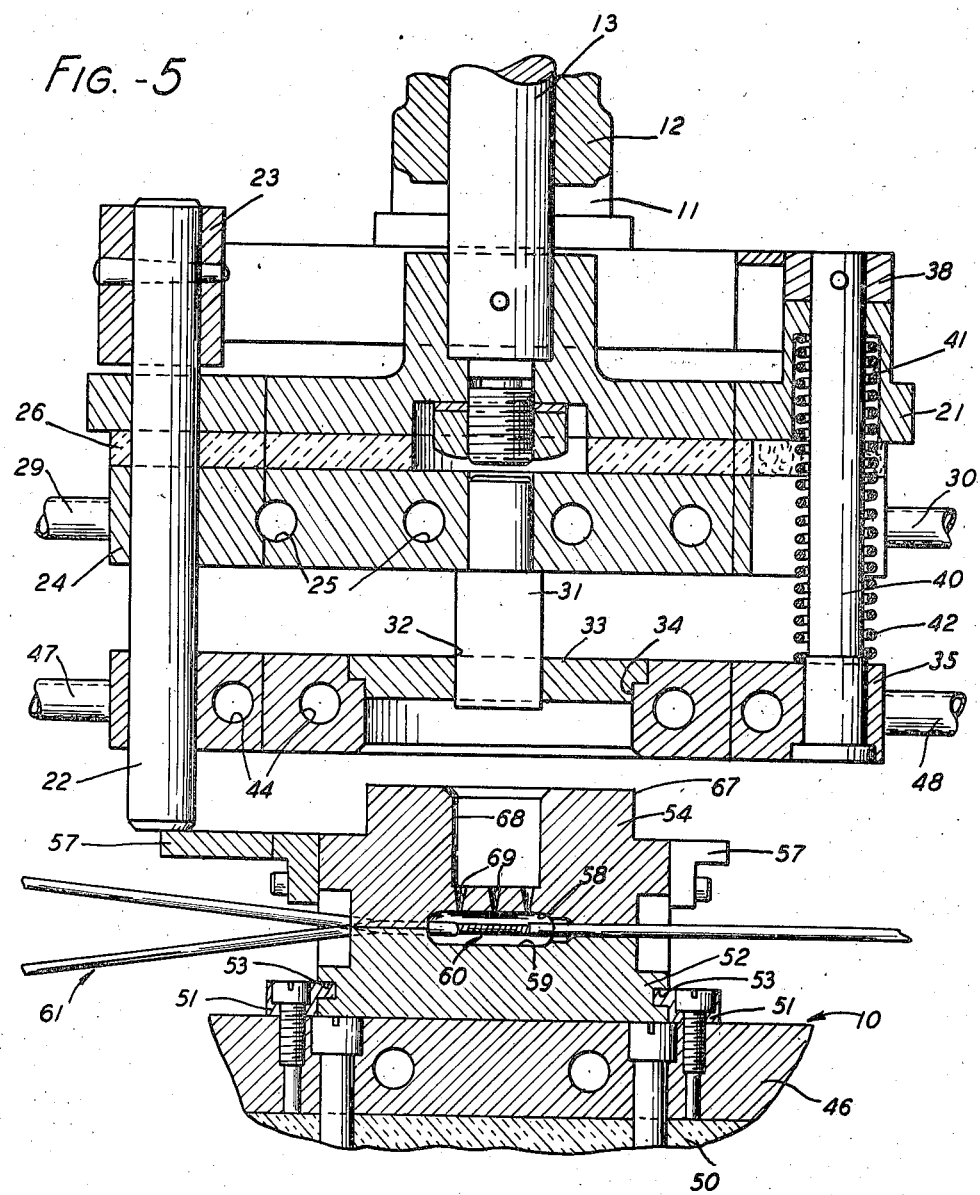
Fig. 5 is an enlarged, fragmentary, vertical sectional view of the apparatus taken along line 5—5 of Fig. 3.

Referring more particularly to the drawings, there is illustrated an apparatus for molding masses of a molding material, such as a rubber compound, around the crotches of Y-type cords, around terminals of conductors, or around other articles. The molding apparatus includes a molding table 10 and an L-shaped standard 11 projecting from the table. The upper end of the standard 11 has a bearing 12 formed thereon which serves to guide a ram 13 which is slidably mounted therein. The ram 13 is pivotally secured to one end of a lever 15 which is fulcrumed on a link 16 pivotally mounted on the standard 11. A piston rod 17 secured to a piston (not shown) enclosed in an air cylinder 18 is pivotally secured to the base of the standard 11 by a pin 20. Thus, when air is supplied to the cylinder 18, the piston rod 17 is forced upwardly, which rotates the lever 15 in a counterclockwise direction, as seen in Fig. 1, and the ram 13 is forced downwardly.

A plate 21 (Fig. 5) secured to the lower end of the ram 13 is slidably mounted on a pair of rods 22—22, which rods are positioned on opposite sides of the standard 11 and are secured rigidly to a stationary frame 23 secured to the standard above the plate 21. An upper platen 24 having steam passages 25—25 formed therein is fastened to the plate 21 and is separated therefrom by a layer 26 of heat insulating material of a conventional type, such as asbestos braid. An inlet pipe 29 serves to supply steam from a suitable source (not shown) to the passages 25—25 and an outlet pipe 30 serves to exhaust the steam from the passages.

An extruding piston 31 (Fig. 5) is secured to the platen 24 and projects through a hole 32 formed in a removable guide 33. The guide is secured by screws (not shown) in an aperture 34 formed in an intermediate platen 35. The platen 35 is slidably mounted on the rods 22—22. A pair of rods 40—40 rigidly secured to the platen 35 project upwardly through a pair of bores illustrated by a bore 41 formed in the plate 21. A pair of collars 38—38 secured on the upper ends of the rods 40—40 limit the distance which the platens 24 and 35 may be separated. A pair of compression springs 42—42 mounted on the rods 40—40 urge the platen 35 away from the platen 24. Steam is supplied by an inlet pipe to a plurality of passages 44—44 formed in the platen 35 and is exhausted from the passages by an outlet pipe 48.

A stationary platen 46 (Fig. 5) secured to the base of the standard 11 has a layer 50 of heat insulating material separating it from the standard. A pair of guide rails 51—51 are bolted to the platen 46. A lower mold section 52 is provided with a pair of slots 53—53 into which the guide rails 51—51 fit when the mold section is moved to the position shown in Fig. 5. An upper mold section 54 fits over the lower mold section 52 to form a complete mold. The upper mold section may be completely separated from the lower mold section.

Figure 7:
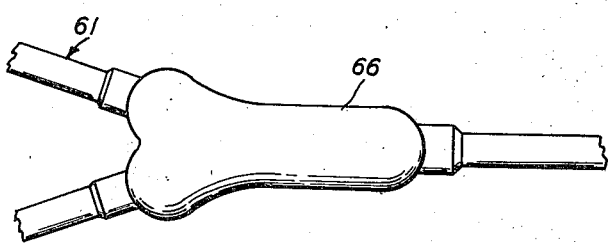
Fig. 7 is an enlarged plan view of a Y-type cord having a mass of molding composition formed on the crotch thereof by the above-described apparatus.

A pair of aligning pins 55—55 (Fig. 6) secured to the lower mold section 52 enter a pair of bores 56—56 formed in the upper mold section 54 when the mold sections 52 and 54 are in molding positions, as shown in Fig. 5, whereby the mold sections are maintained in alignment during the molding operation. The upper mold section 54 has a pair of abutments 57—57 secured thereto and also is provided with a plurality of recesses 58—58 which are complementary to a plurality of recesses 59—59 formed in the lower mold section 52. The recesses 58—58 and 59—59 form together a plurality of mold cavities 60—60, which are designed to retain a plurality of Y-type cords, such as Y-type cords 61—61 and form masses 66—66 of molding composition on the crotches thereof. A Y-type cord having a mass of molding composition formed on the crotch thereof by the apparatus described hereinabove is shown in Fig. 7.

The upper mold section 54 (Fig. 5) has a projection 67 formed thereon, in which an extrusion chamber 68 is formed. A plurality of sprues 69—69 lead from the chamber 68 to the cavities 60—60. The chamber 68 is designed to be charged with a quantity of molding composition, and is of the same size and shape as the extruding piston 31.

A handle 62 secured to an end of the upper mold section 54 has a pair of pins 63—63 projecting from the sides thereof. A pintle 64 is secured to the other end of the mold section 54 by a pair of brackets 65—65.

A platform 70 (Figs. 1 and 2) has a pair of guide rails 71—71 bolted to the upper surface thereof. The platform 70 is secured to a supporting post 72, which is mounted in a pair of bearings 73 and 74. A link 75 serves to connect the lower end of the post to a lever 76, which has a weight 80 secured thereto. The lever 76 is keyed to a shaft 81, which is rotatably mounted in a pair of bearings 82—82 secured to the table 10. A handle 83 is secured to the shaft 81 and serves to rotate the shaft to move the platform 70 from the position shown in Fig. 1 to the position shown in Fig. 4 when the handle 83 is moved in a counterclockwise direction, as viewed in Fig. 1. Conversely, the platform 70 may be moved from a lowered position to the position shown in Fig. 1 by rotating the handle 83 in a clockwise direction, as viewed in Fig. 1. When the platform is in its raised position, the rails 71—71 are in alignment with the rails 51—51 and are designed to fit into the slots 53—53 as the lower mold section 52 is moved on the platform. The upper periphery of a roller 78, which is mounted between the platform 70 and the platen 46, is in the same plane as the upper surface of the platen 46. The roller 78 serves to bridge the gap between the platen 46 and the platform.

A spring-pressed release button 84, when pressed, serves to move a pin 85 out of a notch similar to a notch 86 formed in a plate 87. When the button 84 is released, the pin 85 springs into the notch 86, or the notch similar thereto, depending upon the position of the handle 83, to secure the platform 70 in the position shown in Fig. 4 or the position shown in Fig. 1, respectively.

A pair of stops 90—90 (Fig. 1) are secured to the table 10 adjacent to an end of the platform 70. A pair of stops 91—91 having generally U-shaped notches 92—92 are secured to the table 10 adjacent to the other end of the platform 70. The stops 91—91 have a pair of fingers 97—97 positioned in the path of the pintle 64, which fingers serve to engage the pintle 64 as the mold sections 52 and 54 are slid to positions over the platform 70. The stops 91—91 also serve as hinges for retaining the pintle 64 in the notches when the upper mold section 54 is moved to the position shown in Fig. 4. A latch 93 of a well-known type serves to engage the pins 63—63 and latch the upper mold section in the position shown in Fig. 4.

In the operation of the apparatus described hereinabove, the Y-type cords 61—61, which are to have masses of the molding composition formed thereon, are positioned in the recesses 59—59 in the lower mold section 52 when the upper mold section 54 is in the position shown in Figs. 4 and 6. The upper mold section then is swung over the platform 70, which then is moved to its raised position to force the lower mold section into engagement with the upper mold section and the pins 55—55 into the bores 56—56. The extrusion chamber 68 then is charged with a suitable molding composition, such as a rubber compound, and the mold sections 52 and 54 are thrust between the platen 46 and the platen 35 with the guide rails 51—51 serving to guide the mold sections accurately to their molding positions.

Air then is supplied to the cylinder 18 to move the piston rod 17 upwardly, whereby the ram 13 carries the platens 24 and 35 downwardly until the platen 35 engages the mold section 54 and is stopped. The ram and the platen 24 continue to move downwardly against the actions of the springs 42—42 to force the platen 35 tightly against the upper mold section 54 thereby holding the upper mold against the lower mold section 52. The ram 13 continues its downward movement and the extruding piston 31 enters the charged extrusion chamber 68 and forces the molding composition therein through the sprues 69—69 into the cavities in the mold sections. The steam supplied to the passages in the platens heats the piston 31 and the mold sections 52 and 54, whereby the molding composition in the cavities in the mold sections is vulcanized.

The cylinder 18 then is operated to raise the ram 13 which raises the upper platen 24. As the platen 24 is raised, the platen 35 is kept in engagement with the upper mold section 54 by the springs 42—42 until the collars 38—38 are engaged and drawn upwardly by the plate 21 at which time the platen 35 is raised. As the platen 35 is raised, the upper mold section 54 is separated therefrom by the rods 22—22 which engage the abutments 57—57 secured to the mold section 54. The handle 62 then is grasped and the mold sections 52 and 54 are slid to the left, as viewed in Fig. 1, until the pintle 64 strikes the fingers 97—97, at which time the mold sections are positioned over the platform 70. As the mold sections are so slid, the guide rails 71—71 enter the slots 53—53 formed in the lower mold section 52.

The button 84 then is pushed downwardly and the handle 83 is rotated in a counterclockwise direction to move the platform 70 to the position shown in Fig. 4. As the platform 70 moves downwardly, the mold sections 52 and 54 are also moved downwardly until the pintle 64 engages the stops 91—91 and the left end of the mold section 54, as viewed in Fig. 1, engages the stops 90—90, at which time the movement of the upper mold section 54 will be stopped. However, the guide rails 71—71 projecting into the slots 53—53 formed in the mold section 52 will draw that mold section downwardly with the platform 70 as the platform continues to be drawn downwardly, whereby the upper mold section 54 is separated from the lower mold section 52. The handle 83 then is grasped and, after depressing the button 84, is swung in a clockwise direction, as viewed in Fig. 4, to the position shown in Fig. 4, during which movement the stops 91—91 serve as brackets for retaining the pintle 64 in the notches 92—92. As the mold section 54 is moved to the position shown in Fig. 4, the pins 63—63 are engaged by the latch 93, whereby the mold section 54 is secured by the latch and the stops 91—91 in that position. Thus, free access to the open mold sections 52 and 54 is provided.

The Y-type cords 61—61 having masses of molding composition molded therearound by the above-described operation then can be removed from the recesses 59—59 formed in the mold section 52. The recesses 58—58 and 59—59 may be easily cleaned, if necessary, and similar cords may be inserted in the recesses 59—59 and the above-described operation may be repeated.

As the standard 11 is positioned at the rear of the table 10, the portions of the cords 61—61 projecting laterally from the mold sections 52 and 54 may be easily slid into molding position under the platen 35 without interference from any elements of the molding apparatus. The construction of the standard 11 and the elements for actuating the ram 13 serve to magnify the force of the cylinder 18, whereby the cylinder 18 may be a relatively small cylinder.

Mold sections identical with the mold sections 52 and 54, except for size and shape of the mold cavities and the size and shape of the extrusion chamber, may be substituted for the mold sections 52 and 54. If such a substitution is made, an extruding piston complementary in size and shape to the extrusion chamber in the substituted upper mold section is substituted for the piston 31 and a guide similar to the guide 33 but having a hole therein complementary to the substituted piston is substituted for the guide 33. Thus, the apparatus may be easily adapted to mold masses of molding composition and articles other than those described hereinabove.

When the upper mold section 54 is moved to its open position, as shown in Fig. 4, the recesses 58—58 and 59—59 formed in the mold sections 52 and 54 are freely accessible to an operator, whereby the insertion and the removal of cords or other articles are greately facilitated, resulting in economy of both the time and effort required for a molding operation. Also, the recesses in the mold sections may be readily inspected and cleaned when the mold sections are in their open positions.

What is claimed is:

1. For use in a molding apparatus including a molding press, molding means, which comprises a lower mold section, an upper mold section designed to engage the lower mold section for molding articles therebetween, a guideway for guiding the mold sections into and out of the press, means positioned at the end of the guideway for separating the mold sections, a pintle secured to one end of the upper mold section, and a stationary member having a socket therein serving to receive the pintle and coact therewith to form a hinge, whereby the upper mold section may be pivoted with respect to the lower mold section.

2. In a molding apparatus including a molding press, the combination of a lower mold section having a pair of slots extending along the sides thereof, an upper mold section designed to engage the lower mold section for molding engagement therebetween, a pair of horizontally disposed guide rails for entering the slots in the lower mold section to guide the mold sections into and out of the press, a second pair of horizontally disposed guide rails positioned at the ends of the first-mentioned pair of guide rails for entering the slots in the lower mold section when the mold sections are moved out of the press, means for moving the second pair of guide rails downwardly to lower the mold sections, a pintle secured to one end of the upper mold section, a pair of stationary stops having U-shaped notches positioned in the path of the pintle when the mold sections are moved downwardly by the moving means for engaging the pintle during the downward movement thereof, whereby the pintle is moved into the notches and the mold sections are separated, said stops serving as hinges for the upper mold section, whereby the upper mold section may be pivoted with respect to the lower mold section to open the mold sections, and means for latching the upper mold section in its open position.

3. In a molding apparatus including a molding press, the combination of an upper mold section, a lower mold section complementary to the upper mold section, means for interlocking the mold sections, means for guiding the mold sections into and out of molding positions with respect to the press, a pin secured to the upper mold section, a pair of stationary stops for engaging the pin to stop the mold sections as they are moved out of their molding positions, said stops being provided with a pair of notches into which the pin fits for pivotally mounting the upper mold section, and means for completely separating the mold sections so that the upper mold section may be pivoted with respect to the lower mold section.

4. In a molding apparatus including a stationary platen and pressing means movable toward and away from the platen, the combination of a lower mold section having a pair of slots along the sides thereof, an upper mold section fitting into molding engagement with the lower mold section and a pair of guide rails secured to the platen for entering the slots in the lower mold section to guide the mold sections to positions between the pressing means and the platen, a platform movable vertically to and from the plane in which the platen lies, means for so moving the platform, a pair of guide rails secured to the platform for entering the slots in the lower mold section when the mold sections are moved from positions between the pressing means and the platen, a pintle secured to one end of the upper mold section, a pair of stationary stops having U-shaped notches positioned directly below the ends of the pintle when the mold sections are on the platform, whereby when the platform is moved downwardly out of the plane of the platen, the pintle is moved into the notches and the mold sections are separated, said stops serving as hinges for the upper mold section, whereby the upper mold section may be pivoted with respect to the lower mold section to open the mold sections, and means for latching the upper mold section in its open position.

ALEXANDER C. FRANKWICH.
SAMUEL M. MARTIN.

REFERENCES CITED

The following references are of record in the file of this patent:

UNITED STATES PATENTS

| Number | Name | Date |
|---|---|---|
| 340,555 | Cardona | Apr. 27, 1886 |
| 1,567,766 | Stacy | Dec. 29, 1925 |
| 2,138,047 | Turner | Nov. 29, 1938 |
| 617,414 | Doughty | Jan. 10, 1899 |

FOREIGN PATENTS

| Number | Country | Date |
|---|---|---|
| 688,449 | France | May 12, 1930 |